(12) United States Patent
van den Broek et al.

(10) Patent No.: US 9,098,595 B2
(45) Date of Patent: Aug. 4, 2015

(54) ADAPTIVE NAVIGATION FUNCTIONALITY IN A WEB-BASED DATA-ENTRY GRID

(75) Inventors: Hendrik van den Broek, Lexington, MA (US); Chadwick Chow, Woburn, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 482 days.

(21) Appl. No.: 13/276,903

(22) Filed: Oct. 19, 2011

(65) Prior Publication Data
US 2013/0104021 A1   Apr. 25, 2013

(51) Int. Cl.
G06F 17/30 (2006.01)
G06F 17/24 (2006.01)

(52) U.S. Cl.
CPC .......... *G06F 17/30899* (2013.01); *G06F 17/24* (2013.01)

(58) Field of Classification Search
CPC ....................................................... G06F 17/24
USPC ........................................................ 715/220
See application file for complete search history.

(56) References Cited

U.S. PATENT DOCUMENTS

| | | | |
|---|---|---|---|
| 4,315,312 A | 2/1982 | Schmidt | |
| 5,701,461 A | 12/1997 | Dalal et al. | |
| 5,717,939 A | 2/1998 | Bricklin et al. | |
| 6,199,078 B1 * | 3/2001 | Brittan et al. | 715/234 |
| 6,204,846 B1 | 3/2001 | Little et al. | |
| 6,510,475 B1 | 1/2003 | Bennett | |
| 6,684,207 B1 | 1/2004 | Greenfield et al. | |
| 6,988,098 B2 | 1/2006 | Sonkin et al. | |
| 6,988,241 B1 * | 1/2006 | Guttman et al. | 715/220 |
| 7,480,675 B2 | 1/2009 | Folting et al. | |
| 7,735,023 B1 | 6/2010 | Chadzelek et al. | |
| 7,870,283 B2 | 1/2011 | Sedlak et al. | |
| 7,930,646 B2 | 4/2011 | De Souza Sana et al. | |
| 2005/0071785 A1 | 3/2005 | Chadzelek et al. | |
| 2005/0076015 A1 | 4/2005 | Dettinger et al. | |
| 2008/0244377 A1 * | 10/2008 | Erwig et al. | 715/212 |

(Continued)

FOREIGN PATENT DOCUMENTS

WO   WO 2009/094557 A2   7/2009

OTHER PUBLICATIONS

Google Docs, https://spreadsheets.google.com/, https://spreadsheets.google.com/ccc?key=0Ah2M26T0qsOPdG1JRWNVMmZYdldjandCY2ZpaW-9IeHc&hl=en#gid=0, downloaded on Apr. 11, 2011, 1 page.

(Continued)

*Primary Examiner* — Kavita Padmanabhan
*Assistant Examiner* — Tionna Burke
(74) *Attorney, Agent, or Firm* — Kilpatrick Townsend & Stockton LLP (57) ABSTRACT

Techniques for facilitating navigation in a web-based data entry grid. In one set of embodiments, when a user navigates into a cell of the data entry grid, the user's web browser can wait for a predetermined time period before accessing an application server to retrieve input control information for the cell. If the user enters a command to navigate away from the cell before the predetermined time period has passed, the server access can be avoided, and thus the navigation event can be processed immediately. If no navigation command is received from the user before the predetermined time period has passed, the input control information can be retrieved from the application server and rendered.

18 Claims, 9 Drawing Sheets

(56) References Cited

U.S. PATENT DOCUMENTS

2009/0044143 A1* 2/2009 Karstens .................. 715/802
2010/0325606 A1 12/2010 Sundararajan et al.
2012/0330995 A1* 12/2012 Muenkel .................. 707/769
2013/0103738 A1 4/2013 Evans et al.

OTHER PUBLICATIONS

ZK Spreadsheet Live Demo, http://zssdemo.zkoss.org/, downloaded on Apr. 8, 2011, 1 page.
BlueShoes JavaScript Spreadsheet Editor, http://www.blueshoes.org/en/javascript/spreadsheet/, downloaded on Apr. 8, 2011, 1 page.
COQsoft Editable JavaScript Tree Grid, http://www.treegrid.com/treegrid/www/, downloaded on Apr. 8, 2011, 1 page.
Grid / Virtual scrolling with client binding, http://demos.telerik.com/aspnet-ajax/grid/examples/client/virtualscrollpagingclinentbinding/defaultcs.aspx, downloaded on Oct. 19, 2011, 4 pages.
An Alternative to Pagination : Facebook and Twitter Style, http://youhack.me/2010/05/14/an-alternative-to-pagination-facebook-and-twitter-style, downloaded on Apr. 26, 2011, 13 pages.
Oracle Fusion Middleware Tag Reference: "<af:table>", http://download.oracle.com/docs/cd/E12839_01/apirefs.1111/e12419/tagdoc/af_table.html, downloaded on Apr. 26, 2011, 7 pages.
Virtual scrolling/paging, http://www.telerik.com/help/aspnet-ajax/grdvirtualscrollpaging.html, downloaded on Oct. 19, 2011, 5 pages.

* cited by examiner

ADAPTIVE NAVIGATION FUNCTIONALITY IN A WEB-BASED DATA-ENTRY GRID

CROSS-REFERENCES TO RELATED APPLICATIONS

The present disclosure is related to the following commonly assigned, co-pending U.S. Patent Application, which is incorporated herein by reference in its entirety for all purposes: application Ser. No. 13/276,892, filed concurrently with the present application, entitled "EAGER BLOCK FETCHING FOR WEB-BASED DATA GRIDS."

BACKGROUND

The present disclosure relates in general to web applications, and in particular to techniques for facilitating navigation in a web-based data entry grid.

With the ubiquity of web browsers and broadband Internet access, many types of software that previously existed only as traditional desktop applications are now available in web application form. Generally speaking, a web application is a software application that includes a server component and a client component, where the server component is hosted on a remote server (e.g., a web and/or application server) and the client component is rendered/executed in a common web browser. Examples of popular web applications include email, calendar, and so on.

Certain types of web applications, such as spreadsheets and other kinds of business applications, make use of a data entry grid for receiving and presenting data to a user. As used herein, a data entry grid is a UI component comprising a group of cells that are arranged in a tabular or other similar format. Each cell in the grid can be rendered with an input control for receiving user input (if user focus is currently on the cell), or as a read-only field (if user focus is not currently on the cell). Thus, by navigating into a particular cell in the grid, a user can update the contents of that cell.

One issue with existing web applications that incorporate data entry grids relates to the interaction between the client-side web browser and the server. In particular, current implementations require that the web browser access the server for each navigation event between two cells (in order to, e.g., submit any data entered into the first cell and retrieve input control information for the second cell). This roundtrip to and from the server can be time consuming, and thus problematic in several scenarios. For instance, consider a situation where a user enters data in cell 1×1 of an M×N data entry grid, and then wishes to enter data in cell 10×12 (i.e., nine columns to the right and eleven rows down) without entering any data in the intervening cells. If the user uses, e.g., the arrow keys on his/her keyboard to navigate in a cell-by-cell manner from cell 1×1 to cell 10×12, the UI will "pause" for a brief period of time at each cell as the web browser accesses the server and then renders an input control in the cell. This pausing during navigation can be irritating and significantly reduce the user's efficiency.

Some existing applications may attempt to mitigate this slow navigation behavior by allowing for direct navigation between non-adjacent cells using an alternative input device (e.g., a mouse or touch-sensitive screen). However, in scenarios that require a significant amount of alphanumeric data entry, many users prefer to use a keyboard as their sole input device.

BRIEF SUMMARY

Embodiments of the present invention provide techniques for facilitating navigation in a web-based data entry grid. In one set of embodiments, when a user navigates into a cell of the data entry grid, the user's web browser can wait for a predetermined time period before accessing an application server to retrieve input control information for the cell. If the user enters a command to navigate away from the cell before the predetermined time period has passed, the server access can be avoided, and thus the navigation event can be processed immediately. If no navigation command is received from the user before the predetermined time period has passed, the input control information can be retrieved from the application server and rendered. With this mechanism, the user can enter data into a cell of the data entry grid per standard practice (i.e., by navigating into the cell), but can also quickly traverse, on a cell-by-cell basis, through cells of the data entry grid that the user has no intention of editing.

In an alternative set of embodiments, the user can engage and disengage an explicit navigation mode for the data entry grid. When the explicit navigation mode is engaged, the user's web browser can be prevented from accessing the application server upon each navigation event. Thus, the user can freely navigate between the cells of the data entry grid, without waiting at each cell for a roundtrip data exchange between the web browser and the server. When the explicit navigation mode is disengaged, the web browser can return to the default behavior of accessing the application server each time the user navigates between cells.

According to one embodiment of the present invention, a method is provided comprising receiving, at a computer system, a first user input for navigating to a cell of a data entry grid, modifying, by the computer system, an appearance of the cell to indicate that user focus is on the cell, and determining, by the computer system, whether a second user input for navigating away from the cell is received before a predetermined time period has passed. If the second user input is not received before the predetermined time period has passed, the computer system can render an input control in the cell. If the second user input is received before the predetermined time period has passed, the computer system can modify the appearance of the cell to indicate that user focus is no longer on the cell, without rendering the input control in the cell.

In one embodiment, rendering the input control in the cell comprises sending a request to a remote server for information pertaining to the input control, receiving the requested information from the remote server, and rendering the input control based on the received information.

In one embodiment, the data entry grid is part of a web application.

In one embodiment, the input control is an HTML-based input control.

In one embodiment, the first and second user inputs correspond to keyboard strokes.

In another embodiment, the first and second user inputs correspond to activations of keyboard arrow keys.

In one embodiment, the predetermined time period is user configurable.

In one embodiment, modifying the appearance of the cell to indicate that user focus is on the cell comprises changing the background color of the cell.

In one embodiment, modifying the appearance of the cell to indicate that user focus is no longer on the cell comprises returning the background color of the cell to its original color.

According to another embodiment of the present invention, a non-transitory computer readable medium is provided. The non-transitory computer readable medium has stored thereon program code executable by a computer system, the program code comprising code that causes the computer system to receive a first user input for navigating to a cell of a data entry grid and code that causes the computer system to determine whether a second user input for navigating away from the cell is received before a predetermined time period has passed. If the second user input is not received before the predetermined time period has passed, the program code further comprises code that causes the computer system to access a remote server for retrieving input control information for the cell. If the second user input is received before the predetermined time period has passed, the program code further comprises code that causes the computer system to modify an appearance of the data entry grid to indicate user navigation away from the cell, without accessing the remote server.

According to another embodiment of the present invention, a system is provided. The system includes a processor configured to receive a first user input for navigating to a cell of a data entry grid, modify an appearance of the cell to indicate that user focus is on the cell, and determine whether a second user input for navigating away from the cell is received before a predetermined time period has passed. If the second user input is not received before the predetermined time period has passed, the processor is configured to render an input control in the cell. If the second user input is received before the predetermined time period has passed, the processor is configured to modify the appearance of the cell to indicate that user focus is no longer on the cell, without rendering the input control in the cell.

A further understanding of the nature and advantages of the embodiments disclosed herein can be realized by reference to the remaining portions of the specification and the attached drawings.

DETAILED DESCRIPTION

In the following description, numerous details are set forth in order to provide an understanding of embodiments of the present invention. It will be apparent, however, to one of ordinary skill in the art that certain embodiments can be practiced without some of these details.

Embodiments of the present invention provide techniques for facilitating navigation in a web-based data entry grid. In one set of embodiments, when a user navigates into a cell of the data entry grid, the user's web browser can wait for a predetermined time period before accessing an application server to retrieve input control information for the cell. If the user enters a command to navigate away from the cell before the predetermined time period has passed, the server access can be avoided, and thus the navigation event can be processed immediately. If no navigation command is received from the user before the predetermined time period has passed, the input control information can be retrieved from the application server and rendered. With this mechanism, the user can enter data into a cell of the data entry grid per standard practice (i.e., by navigating into the cell), but can also quickly traverse, on a cell-by-cell basis, through cells of the data entry grid that the user has no intention of editing.

In an alternative set of embodiments, the user can engage and disengage an explicit navigation mode for the data entry grid. When the explicit navigation mode is engaged, the user's web browser can be prevented from accessing the application server upon each navigation event. Thus, the user can freely navigate between the cells of the data entry grid, without waiting at each cell for a roundtrip data exchange between the web browser and the server. When the explicit navigation mode is disengaged, the web browser can return to the default behavior of accessing the application server each time the user navigates between cells.

Figure 1:
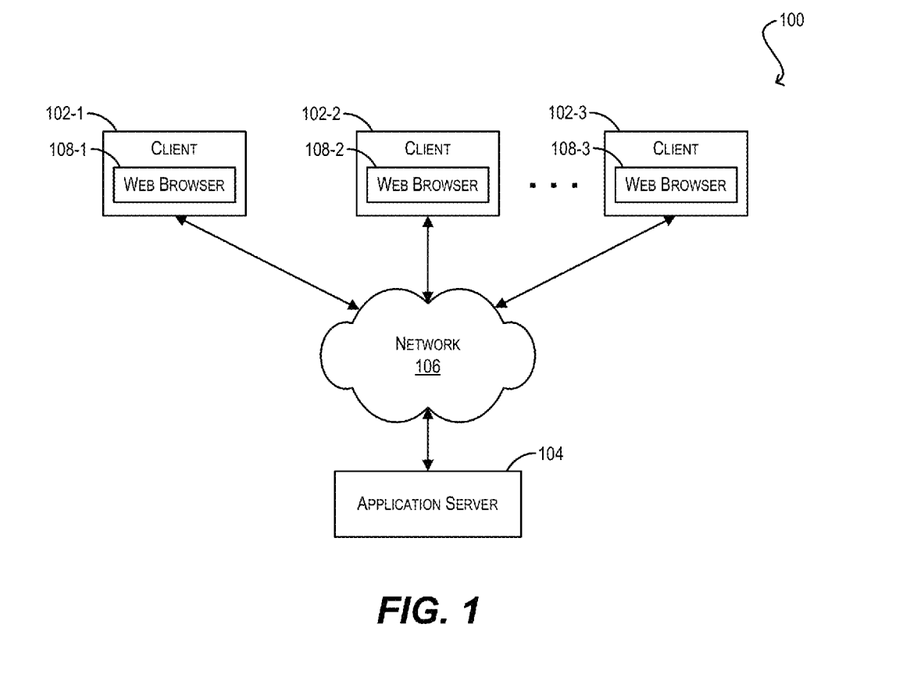
FIG. 1 is a simplified block diagram of a system environment in accordance with an embodiment of the present invention.

FIG. 1 is a simplified block diagram of a system environment 100 according to an embodiment of the present invention. As shown, system environment 100 can include a number of clients 102-1, 102-2, 102-3 that are communicatively coupled with an application server 104 via a network 106. Although FIG. 1 depicts three clients and one application server, any number of these entities can be supported.

Application server 104 can be a software and/or hardware-based module that is configured to provide an environment in which the server-side component of a distributed (i.e., client-server) software application can be executed. For example, in one embodiment, application server 104 can receive a request from a client that is directed to an application hosted on server 104, process the request using business logic defined for the application, and then generate information responsive to the request for transmission to the client. Application server 104 can also provide additional services, such as clustering, load balancing, and automatic fail-over. Examples of commercially available application servers include Oracle WebLogic Server developed by Oracle, IIS Server developed by Microsoft, WebSphere Application Server developed by IBM, and SAP NetWeaver Application Server developed by SAP AG.

In certain embodiments, application server 104 can be configured to host one or more web applications. As discussed previously, a web application is a distributed software application in which the client component is rendered/executed in a common web browser. In these embodiments, application server 104 can incorporate a web server to handle the web-specific tasks of receiving Hypertext Transfer Protocol (HTTP) requests from clients and servicing those requests by returning HTTP responses. Alternatively, application server 104 can operate in conjunction with a web server that is physically or functionally separate from application server 104. For example, in one embodiment, application server 104 can interoperate with an instance of Oracle HTTP Server, a web server software application developed by Oracle Corporation.

Network 106 can any type of network that supports data communications using a networking protocol such as TCP/IP, Ethernet, or the like. By way of example, network 106 can be a local area network (LAN), a wide-area network (WAN), a virtual network, such as a virtual private network (VPN), or the Internet. In certain embodiments, network 106 can comprise a collection of interconnected networks.

Clients 102-1, 102-2, 102-3 can each be a computing device such as a desktop computer, a laptop computer, a server computer, a network appliance, a gaming device, a personal digital assistant, a smartphone, a tablet, or the like. As shown in FIG. 1, each client 102-1, 102-2, 102-3 can be configured to execute a web browser 108-1, 108-2, 108-3 respectively. Examples of commercially available web browsers include Internet Explorer developed by Microsoft, Firefox developed by Mozilla, Chrome developed by Google, and Safari developed by Apple.

In one set of embodiments, web browsers 108-1, 108-2, 108-3 can execute a client-side component of a web application hosted on application server 104. In these embodiments, users of clients 102-1, 102-2, 102-3 can interact with the web application via a user interface presented via the web browsers. In a particular embodiment, executing this client-side component on web browsers 108-1, 108-2, 108-3 can comprise rendering HyperText Markup Language (HTML) content that is received by the browsers from application server 104, receiving user input via one or more HTML-based input controls, and transmitting the user input to application server 104. In a further embodiment, executing the client-side component can comprise running application code, such as JavaScript and/or a Java applet, that is received by web browsers 108-1, 108-2, 108-3 from application server 104.

In certain embodiments, the web application hosted on application server 104 (and accessed via web browsers 108-1, 108-2, 108-3) can implement a web-based data entry grid. As discussed previously, a data entry grid is a UI component comprising a group of cells that are arranged in a tabular or other similar format. Each cell in the grid can be rendered with an input control for receiving user input (if user focus is currently on the cell), or as a read-only field (if user focus is not currently on the cell). Thus, by navigating into a particular cell in the grid, a user can update the contents of that cell.

An issue with current web applications that implement data entry grids is that the client-side component executing in the web browser is required to access the server for each navigation event between two cells (in order to, e.g., submit any data entered into the first cell and retrieve input control information for the second cell). This roundtrip to and from the server can be time consuming and can cause the UI presented in the web browser to "pause" for a brief period of time as the user navigates from one cell to the next. This pausing behavior can be irritating, particularly in scenarios where the user only needs to enter data in a select few cells (and thus needs to traverse through the remaining cells to reach the cells of interest).

Embodiments of the present invention address this problem (and other similar problems) by implementing logic in the client-side component to anticipate whether a user intends to enter data into a cell of a data entry grid or simply navigate past that cell to another destination cell. In one embodiment, this logic can include determining when a user has navigated into a cell, and subsequently waiting for a predetermined period of time before sending a request to the server to, e.g., retrieve input control information for the cell. If the user navigates away from the cell and into another cell within the predetermined period of time, the server request is never sent and thus the delay associated with the request can be avoided. However, if user focus remains on the cell after the predetermined period of time expires, it is assumed that the user wishes to enter data into the cell, and thus the roundtrip data exchange between the web browser and the server can be carried out.

With this mechanism, the user does not need to substantially change his/her behavior when entering data into a cell of a web-based data entry grid—the user can simply navigate into the cell per standard practice and enter data when the input control for the cell is rendered. At the same time, the user can quickly traverse through a large number of cells on a cell-by-cell basis (using, e.g., keyboard navigation keys) without having to wait at each cell for a roundtrip data exchange between the client-side web browser and the server.

The specific processing that can be carried out by web browsers 108-1, 108-2, 108-3 to implement this functionality is discussed with respect to FIG. 2 below.

It should be appreciated that system environment 100 is illustrative and is not intended to limit embodiments of the present invention. For example, the various entities depicted in system environment 100 can have other capabilities or include other components that are not specifically described. One of ordinary skill in the art will recognize many variations, modifications, and alternatives.

Figure 2:
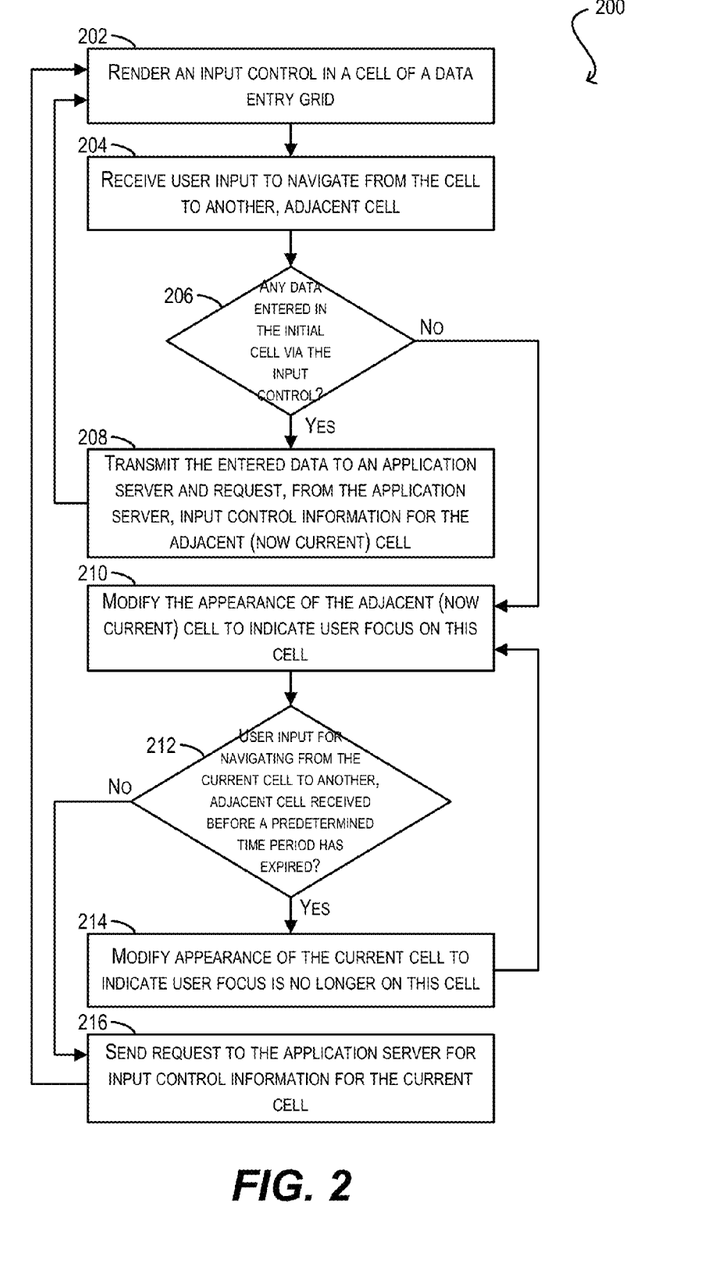
FIG. 2 is a flow diagram of a process for facilitating navigation in a web-based data entry grid in accordance with an embodiment of the present invention.

FIG. 2 is a flow diagram of a process 200 for facilitating navigation in a web-based data entry grid according to an embodiment of the present invention. In one set of embodiments, process 300 can be carried out by web browsers 108-1, 108-2, 108-3 of FIG. 1. For example, in certain embodiments, process 200 can be embodied in program code (e.g., JavaScript or Java code) that is transmitted by application server 104 to clients 102-1, 102-2, 102-3 for execution by web browsers 108-1, 108-2, 108-3. In these and other embodiments, the program code can be stored on a machine-readable storage medium.

At block 202, web browser 108-1, 108-2, or 108-3 can render an input control for a cell of a web-based data entry grid that is currently selected by a user. This input control can be rendered based on information that was previously retrieved from application server 104. In a particular embodiment, the rendered input control can be an HTML-based input control, such as an HTML text field, an HTML poplist, or the like.

At block 204, web browser 108-1, 108-2, or 108-3 can receive user input to navigate away from the current cell and into another, adjacent cell of the data entry grid. For example, the user input can comprise an activation of a keyboard arrow key, or some other type of keyboard input event.

In response to receiving the user input at block 204, web browser 108-1, 108-2, or 108-3 can determine whether any data was actually entered or modified by the user via the input control rendered at block 202 (block 206). If data was entered/modified, the web browser can transmit the entered/modified data to application server 104 and request from server 104 input control information for the cell that the user has navigated into (now the current cell) (block 208). The control flow can then return to block 202, where the input control for the current cell can be rendered based on the information requested at block 208.

If no data was determined to be entered/modified at decision block 206, web browser 108-1, 108-2, or 108-3 can modify the appearance of the cell the user has navigated into (i.e., the current cell) to indicate that user focus is now on this cell (block 210). In addition, web browser 108-1, 108-2, or 108-3 can modify the appearance of the cell the user navigated away from (i.e., the previous cell) to indicate that user focus is no longer on that cell. In one set of embodiments, web browser 108-1, 108-2, or 108-3 can change the background colors of these cells to indicate user focus (or lack thereof). For example, the background color of the current cell can be changed to a highlight color, while the background color of the previous cell can change to white (i.e., clear). In other embodiments, other aspects of cell appearance (e.g., cell size, text size or color, etc.) can be modified to denote this change in user focus.

At block 212, web browser 108-1, 108-2, or 108-3 can determine whether a user input for navigating away from the current cell (and into another, adjacent cell) is received before a predetermined time period has expired. Like the user input received at block 204, the user input received at block 212 can comprise an activation of a keyboard arrow key, or some other type of keyboard input event. In certain embodiments, the predetermined time period that is used as the threshold in block 212 can be user configurable and can be set by an administrator of application server 104 (e.g., as part of the configuration of the web application on server 104), or by a developer of the web application at design-time of the application. By way of example, the predetermined time period can be set to 1000 milliseconds, 500 milliseconds, or less.

If a navigation input is not received before the predetermined time period has expired, web browser 108-1, 108-2, or 108-3 can assume that the user wishes to enter/modify data in the current cell, and thus can send a request to application server 104 for input control information for this cell (block 216). The control flow can then return to block 202, where the input control for the current cell can be rendered based on the information requested at block 216.

If a navigation input is received before the predetermined time period has expired, web browser 108-1, 108-2, or 108-3 can assume that the user does not wish enter/modify data in the current cell, and thus can avoid sending a request to application server 104. Rather, the web browser can simply modify the appearance of the current cell to indicate that user focus is no longer on this cell (block 216). The control flow can then return to block 210, where web browser 108-1, 108-2, or 108-3 can modify the appearance of the cell the user has navigated into (now the current cell) to indicate user focus is on this cell. Thus, when no navigation input is determined to be received at block 212, the roundtrip data exchange between the web browser and the application server can be completely avoided, thereby increasing the speed at which the user can navigate to the next cell. If the user enters multiple successive navigation inputs, each within the predetermined time period described above, the user can quickly traverse across cells of the data entry grid that the user has no intention of editing.

It should be appreciated that process 200 is illustrative and that variations and modifications are possible. Steps described as sequential may be executed in parallel, order of steps may be varied, and steps may be modified, combined, added, or omitted. One of ordinary skill in the art would recognize many variations, modifications, and alternatives.

Figure 3:
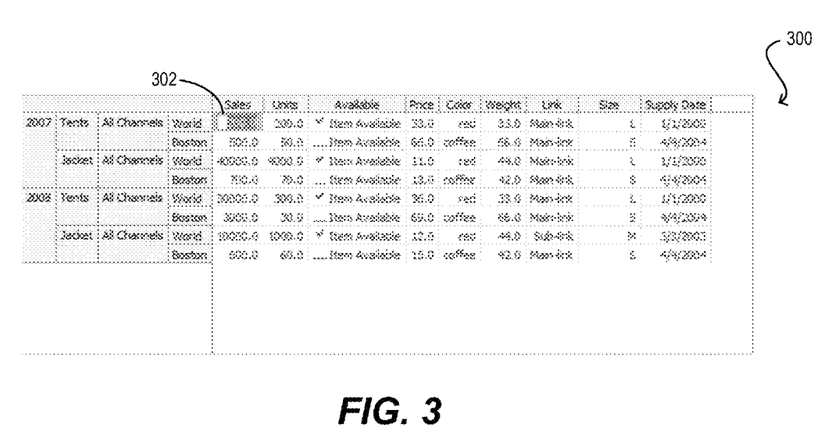
FIGS. 3-7 are screenshots of a web-based data entry grid in accordance with an embodiment of the present invention.

FIGS. 3-7 are screenshots of a web-based data entry grid (as presented in a web browser) that illustrate the processing described with respect to process 200 of FIG. 2. For example, screenshot 300 of FIG. 3 depicts a data entry grid where cell 302 (with data value 200) is initially selected by a user. As shown, cell 302 is rendered with an HTML input field that allows the user to enter a new data value or modify the current data value of the cell.

Figure 4:
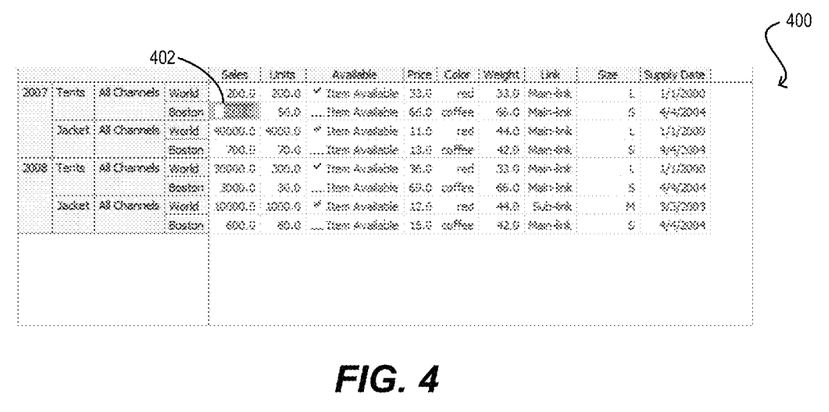

Assume that the user modifies the data value for cell 302 and then navigates down one row. Screenshot 400 of FIG. 4 depicts the state of the data entry grid after these user inputs are received. As shown, cell 402 (one row down from cell 302) is now rendered with an HTML input field, and cell 302 is rendered as a read-only field. Since data was entered in cell 302, the web browser did not wait to determine whether it should render the input control in cell 402; rather the web browser automatically sent a request to the application server for the input control information of cell 402 and rendered the input control accordingly (per block 208 of FIG. 2).

Figure 5:
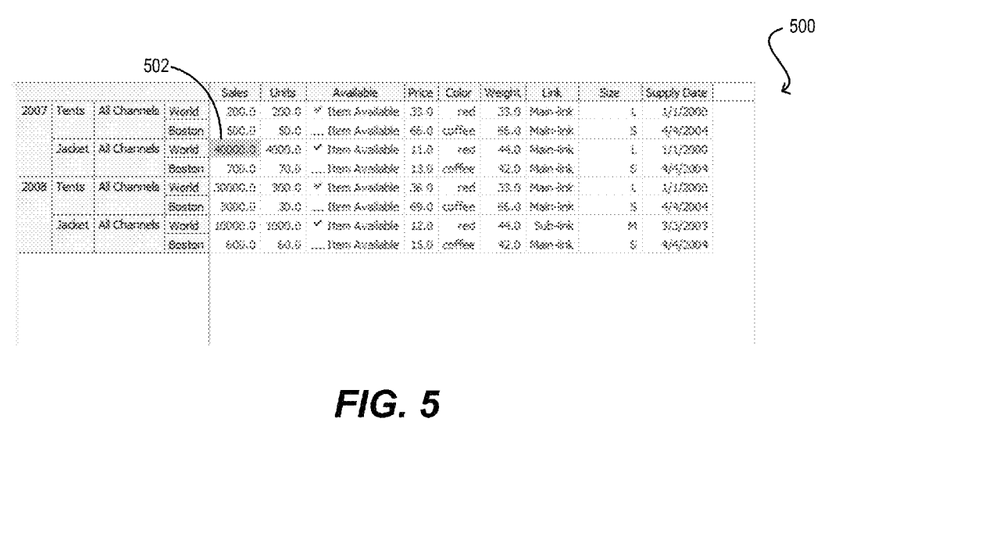

Further assume that the user navigates down another row, without modifying the data in cell 402. In response to this new navigation input, screenshot 500 of FIG. 5 illustrates that cell 502 (one row down from cell 402) is now rendered with a particular background color (gray), thereby indicating that user focus has changed from cell 402 to 502. In addition, cell 402 is now rendered as a read-only field. However, no input control is immediately retrieved and rendered in cell 502. Rather, per the processing of FIG. 2, the web browser can wait to determine whether another navigation input will be received within a predetermined time period (e.g., 500 milliseconds) while user focus is on cell 502. If no such input in received within the predetermined time period, the web browser can send a request to the application server for input control information to be rendered in cell 502, and render the input control accordingly (see screenshot 700 of FIG. 7).

Figure 6:
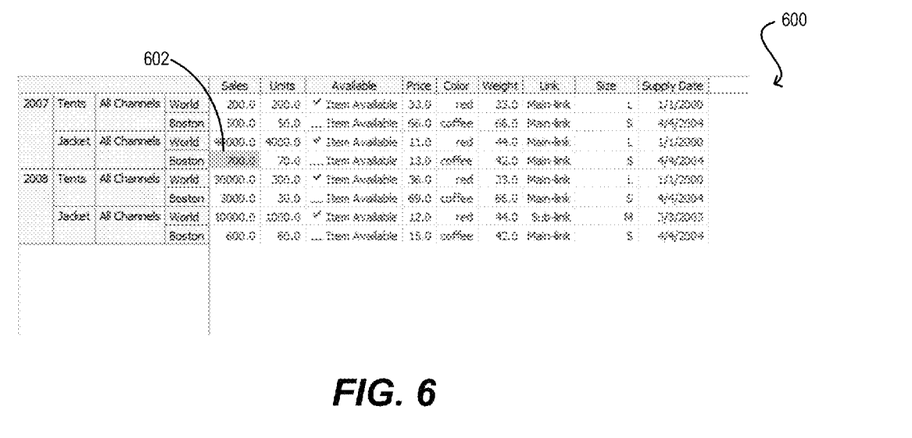
Figure 7:
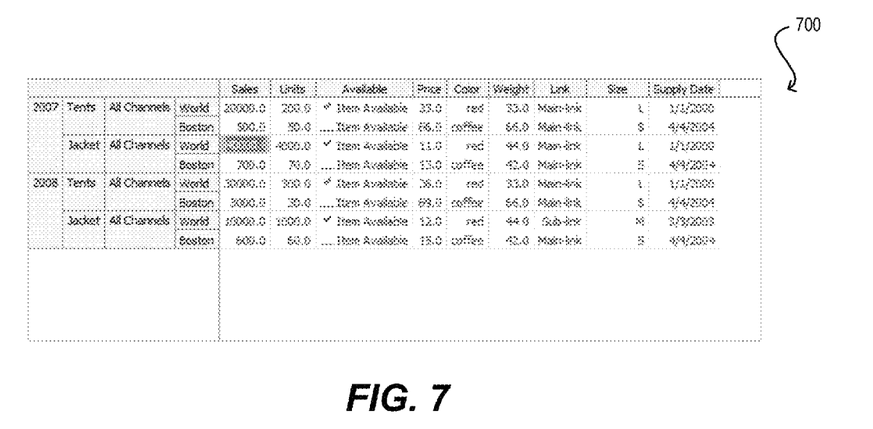

However, if a navigation input is received within the predetermined time period, the server access can be aborted and the navigation event can be processed immediately (without requesting or rendering any input control in cell 502). For example, screenshot 600 of FIG. 6 illustrates the state of the data entry grid after receiving a user input to navigate down one row from cell 502 within the predetermined time period. As shown, cell 602 is now highlighted, thereby indicating that user focus has changed from cell 502 to 602, and cell 502 is now rendered without any background color. Since this change in user focus occurs without waiting for a roundtrip data exchange to be completed between the web browser and the application server, the responsiveness of the data entry grid (and thus the UI experience for the end-user) is significantly improved.

Figure 8:
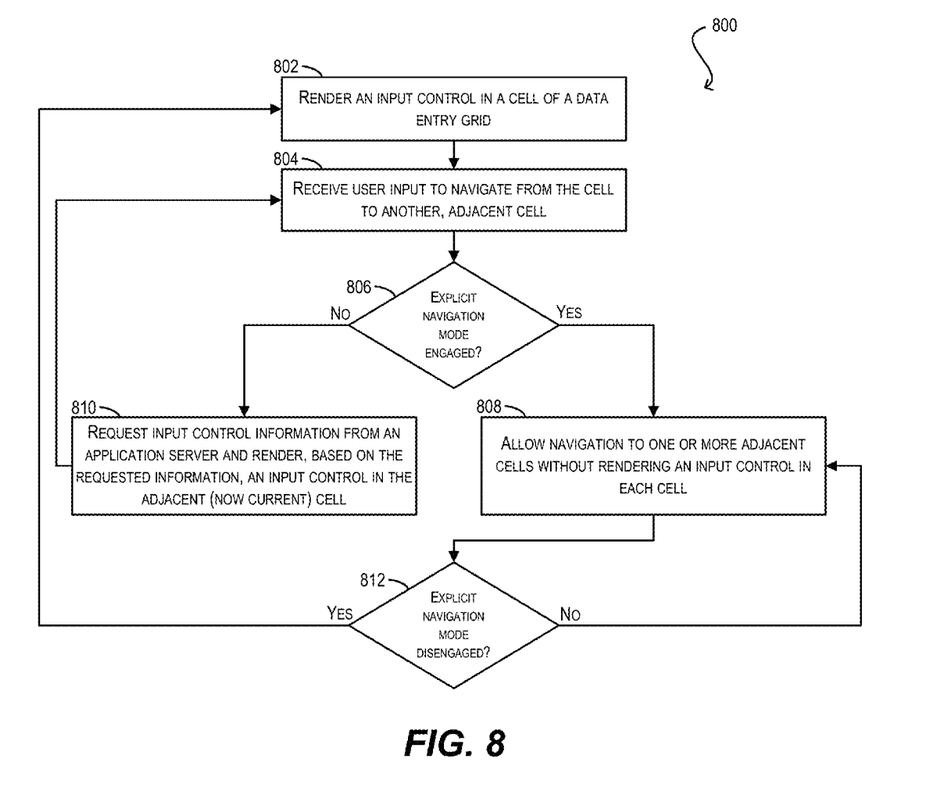
FIG. 8 is a flow diagram of another process for facilitating navigation in a web-based data entry grid in accordance with an embodiment of the present invention.

In addition to (or in replacement of) the adaptive technique described above with respect to FIGS. 2-7, certain embodiments of the present invention can also provide an explicit navigation mode for navigating through a web-based data entry grid. FIG. 8 is a flow diagram of a process 800 for implementing this mode. In one set of embodiments, process 800 can be carried out by web browsers 108-1, 108-2, 108-3 of FIG. 1. For example, in certain embodiments, process 800 can be embodied in program code (e.g., JavaScript or Java code) that is transmitted by application server 104 to clients 102-1, 102-2, 102-3 for execution by web browsers 108-1, 108-2, 108-3. In these and other embodiments, the program code can be stored on a machine-readable storage medium.

At block 802, web browser 108-1, 108-2, or 108-3 can render an input control in a cell of a web-based data entry grid. At block 804, web browser 108-1, 108-2, or 108-3 can receive user input to navigate away from the current cell and into another, adjacent cell of the grid. In various embodiments, these steps can be substantially similar to blocks 202 and 204 of FIG. 2.

Upon receiving the user input at block 804, web browser 108-1, 108-2, or 108-3 can determine whether an explicit navigation mode has been engaged (block 804). In one set of embodiments, the user can engage this mode by activating an appropriate key (e.g., escape) or sequence of keys. If explicit navigation mode is engaged, web browser 108-1, 108-2, or 108-3 can be prevented from accessing application server 104 upon each navigation event. Thus, at block 806, web browser 108-1, 108-2, or 108-3 can allow navigation through one or more adjacent cells without accessing the application server or rendering any input controls in the traversed cells. This can continue until the user disengages the explicit navigation mode (block 812).

If explicit navigation mode is not engaged (or is disengaged), the web browser can carry out its default behavior of accessing the application server each time the user navigates between cells. Thus, at block 810, web browser 108-1, 108-2, or 108-3 can request input control information from application server 104 and render, based on the requested information, an input control in the cell the user has navigated into (now the current cell). The control flow can then return to block 804, where another user input can be received to navigate away from the current cell.

It should be appreciated that process 800 is illustrative and that variations and modifications are possible. Steps described as sequential may be executed in parallel, order of steps may be varied, and steps may be modified, combined, added, or omitted. One of ordinary skill in the art would recognize many variations, modifications, and alternatives.

Figure 9:
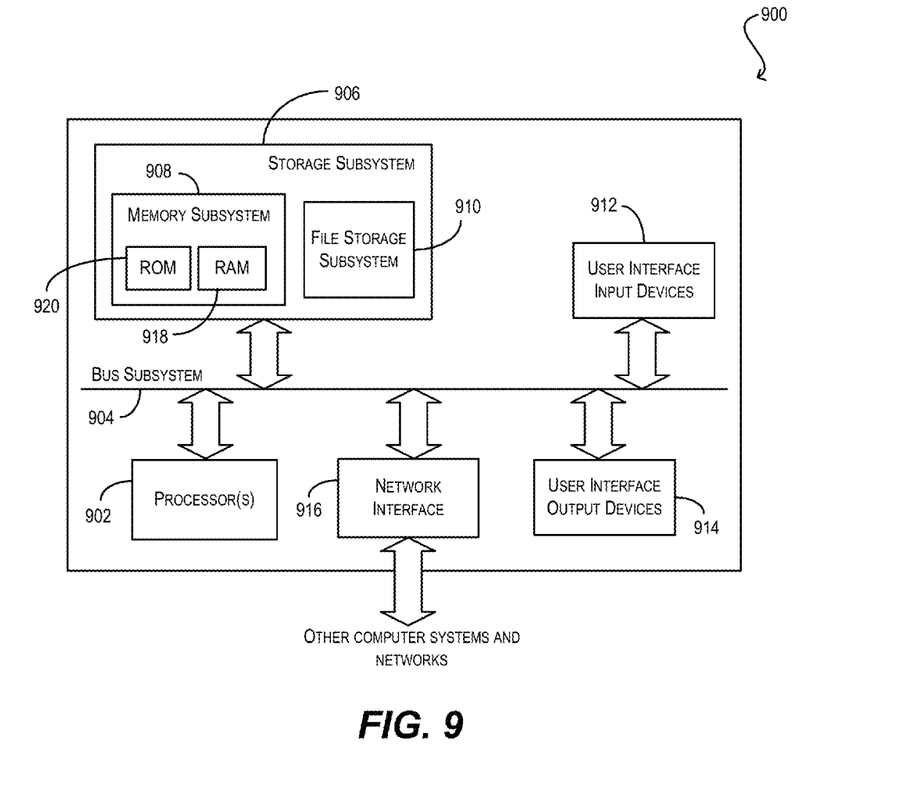
FIG. 9 is a simplified block diagram of a computer system in accordance with an embodiment of the present invention.

FIG. 9 is a simplified block diagram of a computer system 900 according to an embodiment of the present invention. In one set of embodiments, computer system 900 can be used to implement any of the entities 102-1, 102-2, 102-3, or 104 described with respect to FIG. 1. As shown in FIG. 9, computer system 900 can include one or more processors 902 that communicate with a number of peripheral devices via a bus subsystem 904. These peripheral devices can include a storage subsystem 906 (comprising a memory subsystem 908 and a file storage subsystem 910), user interface input devices 912, user interface output devices 914, and a network interface subsystem 916.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks (e.g., network 106 of FIG. 1). Embodiments of network interface subsystem 916 can include an Ethernet card, a modem (telephone, satellite, cable, ISDN, etc.), digital subscriber line (DSL) units, and the like.

User interface input devices 912 can include a keyboard, pointing devices (e.g., mouse, trackball, touchpad, etc.), a scanner, a barcode scanner, a touch-screen incorporated into a display, audio input devices (e.g., voice recognition systems, microphones, etc.) and other types of input devices. In general, use of the term "input device" is intended to include all possible types of devices and mechanisms for inputting information into computer system 900.

User interface output devices 914 can include a display subsystem, a printer, a fax machine, or non-visual displays such as audio output devices, etc. The display subsystem can be a cathode ray tube (CRT), a flat-panel device such as a liquid crystal display (LCD), or a projection device. In general, use of the term "output device" is intended to include all possible types of devices and mechanisms for outputting information from computer system 900.

Storage subsystem 906 can include a memory subsystem 908 and a file/disk storage subsystem 910. Subsystems 908 and 910 represent computer-readable storage media that can store program code and/or data that provide the functionality of embodiments of the present invention.

Memory subsystem 908 can include a number of memories including a main random access memory (RAM) 918 for storage of instructions and data during program execution and a read-only memory (ROM) 920 in which fixed instructions are stored. File storage subsystem 910 can provide persistent (i.e., non-volatile) storage for program and data files, and can include a magnetic or solid-state hard disk drive, a floppy disk drive along with associated removable media, an optical drive along with associated removable media (e.g., CD-ROM, DVD, Blu-Ray, etc.), a removable flash memory-based drive or card, and/or other types of storage media known in the art.

It is should be appreciated that computer system 900 is illustrative and not intended to limit embodiments of the present invention. Many other configurations having more or fewer components than system 900 are possible.

Although specific embodiments of the invention have been described above, various modifications, alterations, alternative constructions, and equivalents are within the scope of the invention. For example, although embodiments of the present invention have been described with respect to certain flow diagrams and steps, it should be apparent to those skilled in the art that the scope of the present invention is not limited to the described diagrams/steps.

Further, although embodiments of the present invention have been described using a particular combination of hardware and software, it should be recognized that other combinations of hardware and software are also within the scope of the present invention.

The specification and drawings are, accordingly, to be regarded in an illustrative rather than restrictive sense. It will be evident that additions, subtractions, and other modifications may be made thereunto without departing from the broader spirit and scope of the invention as set forth in the following claims.

What is claimed is:

1. A method comprising:
receiving, at a computer system, a first user input for navigating to a cell of a data entry grid;
modifying, by the computer system, an appearance of the cell to indicate that user focus is on the cell;
determining, by the computer system, whether a second user input for navigating away from the cell is received before a predetermined time period has passed;
transmitting, by the computer system, a request to a remote server to request input control information for only the cell in response to the predetermined period of time having passed without the second user input being received;
rendering, by the computer system, an input control for only the cell based on the requested input control information in response to the predetermined period of time having passed without the second user input being received, wherein:
the input control permits user input to be received for the cell; and
each other cell of the data entry grid is read-only while the input control permits the user input to be received for the cell; and
if the second user input is received before the predetermined time period has passed, modifying, by the computer system, the appearance of the cell to indicate that user focus is no longer on the cell, without rendering the input control in the cell.

2. The method of claim 1 wherein rendering the input control in the cell comprises:
receiving the requested information from the remote server.

3. The method of claim 1 wherein the data entry grid is part of a web application.

4. The method of claim 3 wherein the input control is an HTML-based input control.

5. The method of claim 1 wherein the first and second user inputs correspond to keyboard strokes.

6. The method of claim 5 wherein the first and second user inputs correspond to activations of keyboard arrow keys.

7. The method of claim 1 wherein the predetermined time period is user configurable.

8. The method of claim 1 wherein modifying the appearance of the cell to indicate that user focus is on the cell comprises changing the background color of the cell.

9. The method of claim 8 wherein modifying the appearance of the cell to indicate that user focus is no longer on the cell comprises returning the background color of the cell to its original color.

10. A non-transitory computer readable medium having stored thereon program code executable by a computer system, the program code comprising:
   code that causes the computer system to receive a first user input for navigating to a cell of a data entry grid;
   code that causes the computer system to determine whether a second user input for navigating away from the cell is received before a predetermined time period has passed;
   code that causes the computer system to transmit a request to a remote server to request input control information for only the cell in response to the predetermined period of time having passed without the second user input being received;
   code that causes the computer system to render an input control for only the cell based on the requested input control information in response to the predetermined period of time having passed without the second user input being received, wherein:
   the input control permits user input to be received for the cell; and
   each other cell of the data entry grid is read-only while the input control permits the user input to be received for the cell; and
   if the second user input is received before the predetermined time period has passed, code that causes the computer system to modify an appearance of the data entry grid to indicate user navigation away from the cell, without accessing the remote server.

11. The non-transitory computer readable medium of claim 10 wherein the data entry grid is part of a web application.

12. The non-transitory computer readable medium of claim 10 wherein the input control information pertains to an HTML-based input control.

13. The non-transitory computer readable medium of claim 10 wherein the first and second user inputs correspond to keyboard strokes.

14. A system comprising:
   one or more processors; and
   a memory communicatively coupled with and readable by the one or more processors and having stored therein processor-readable instructions which, when executed by the one or more processors, cause the one or more processors to:
     receive a first user input for navigating to a cell of a data entry grid;
     modify an appearance of the cell to indicate that user focus is on the cell;
     determine whether a second user input for navigating away from the cell is received before a predetermined time period has passed;
     transmit a request to a remote server to request input control information for only the cell in response to the predetermined period of time having passed without the second user input being received;
     render an input control for only the cell based on the requested input control information in response to the predetermined period of time having passed without the second user input being received, wherein:
     the input control permits user input to be received for the cell; and
       each other cell of the data entry grid is read-only while the input control permits the user input to be received for the cell; and
     if the second user input is received before the predetermined time period has passed, modify the appearance of the cell to indicate that user focus is no longer on the cell, without rendering the input control in the cell.

15. The system of claim 14 wherein the processor-readable instructions that, when executed, cause the one or more processors to render the input control in the cell comprise processor-readable instructions which, when executed, cause the one or more processors to:
   receive the requested information from the remote server.

16. The system of claim 14 wherein the data entry grid is part of a web application.

17. The system of claim 14 wherein the input control is an HTML-based input control.

18. The system of claim 14 wherein the first and second user inputs correspond to keyboard strokes.

* * * * *

UNITED STATES PATENT AND TRADEMARK OFFICE
CERTIFICATE OF CORRECTION

PATENT NO. : 9,098,595 B2  
APPLICATION NO. : 13/276903  
DATED : August 4, 2015  
INVENTOR(S) : van den Broek et al.

It is certified that error appears in the above-identified patent and that said Letters Patent is hereby corrected as shown below:

On page 2, column 2, under Other Publications, line 4, delete "/virtualscrollpagingclinentbinding/" and insert -- /virtualscrollpagingclientbinding/ --, therefor.

Signed and Sealed this  
Fifteenth Day of March, 2016

Michelle K. Lee  
*Director of the United States Patent and Trademark Office*